United States Patent
Spinelli et al.

(10) Patent No.: US 10,614,832 B2
(45) Date of Patent: Apr. 7, 2020

(54) SYSTEM AND METHOD FOR DIARIZATION BASED DIALOGUE ANALYSIS

(71) Applicants: Amy Spinelli, Seattle, WA (US); Kimberly Mitchell, Seattle, WA (US)

(72) Inventors: Amy Spinelli, Seattle, WA (US); Kimberly Mitchell, Seattle, WA (US)

(73) Assignee: Earshot LLC, Seattle, WA (US)

( * ) Notice: Subject to any disclaimer, the term of this patent is extended or adjusted under 35 U.S.C. 154(b) by 474 days.

(21) Appl. No.: 15/256,387

(22) Filed: Sep. 2, 2016

(65) Prior Publication Data

US 2017/0069226 A1    Mar. 9, 2017

Related U.S. Application Data

(60) Provisional application No. 62/213,801, filed on Sep. 3, 2015.

(51) Int. Cl.
| | |
|---|---|
| *A63F 9/24* | (2006.01) |
| *G10L 25/78* | (2013.01) |
| *G10L 17/06* | (2013.01) |
| *G09B 5/04* | (2006.01) |
| *G10L 15/18* | (2013.01) |

(52) U.S. Cl.
CPC .............. *G10L 25/78* (2013.01); *G09B 5/04* (2013.01); *G10L 17/06* (2013.01); *G10L 15/1822* (2013.01)

(58) Field of Classification Search
CPC ...... G10L 15/26; G10L 15/22; G10L 15/1822
See application file for complete search history.

(56) References Cited

U.S. PATENT DOCUMENTS

| | | | | |
|---|---|---|---|---|
| 4,543,957 | A * | 10/1985 | Friedman | A61B 5/16 600/300 |
| 6,421,645 | B1 * | 7/2002 | Beigi | G06F 17/30746 704/251 |
| 9,375,845 | B1 * | 6/2016 | Annan | B25J 11/0005 |
| 2005/0278180 | A1 * | 12/2005 | O'Neill | G10L 15/1822 704/275 |
| 2010/0185437 | A1 * | 7/2010 | Visel | G06F 17/271 704/9 |
| 2014/0250145 | A1 * | 9/2014 | Jones | G06Q 10/101 707/769 |
| 2016/0306788 | A1 * | 10/2016 | Avore | G10L 17/06 |

* cited by examiner

*Primary Examiner* — David L Lewis
*Assistant Examiner* — Eric M Thomas
(74) *Attorney, Agent, or Firm* — Marin Patents LP; Gustavo Marin

(57) ABSTRACT

A preferred embodiment of the invention relates to a dialogue analysis system that can analyze speech of a user communicating with other participants in a dialogue. The user can be a lead speaker of the dialogue. The dialogue analysis system can receive voice signals of the user and the other participants from their respective communication devices. Subsequently, the dialogue analysis system can identify speech of a user in order to differentiate that speech from speeches of other participants. The dialogue analysis system can analyze the speech of the user as well as collective speeches of the other participants. Based on the analysis, the dialogue analysis system can generate a customized report for the user. The dialogue analysis system can deliver the customized report for the user to a computing device.

18 Claims, 12 Drawing Sheets

SYSTEM AND METHOD FOR DIARIZATION BASED DIALOGUE ANALYSIS

CROSS REFERENCE TO RELATED APPLICATIONS

This application claims the benefit of, and priority to, U.S. provisional application 62/213,804 titled, "DIALOGUE ANALYSIS SYSTEM" and filed on Sep. 3, 2015, the entire specification of which is incorporated herein by reference.

BACKGROUND

Fields of the Invention

The disclosure as detailed herein is in the technical field of professional development. More specifically, the present disclosure relates to the technical field of methods for education. Even more specifically, the present disclosure relates to the technical field of voice analysis.

Description of Related Art

In a dialogue, there is often a lead speaker communicating with other participants. The lead speaker can be a teacher communicating with students in a class, a coach of a sports team communicating with team members, an organizer of an event communicating with event attendees, an invited speaker discussing a topic with people in a gathering, and so on. To improve speaking ability, people often read books that provide speech improvement tips. Some people read or hear general criticisms of other speakers to improve their own speech. However, because everyone has a different way of speaking, it is important for a person to analyze his or her own speech. In this endeavor, some people practice presentations in front of their peers, who then provide criticisms to help improve speech of a speaker. However, such criticisms are not always constructive, and sometimes can be harmful, as they are based on individual opinions rather than facts related to speech of the speaker, such as specific speech times of the lead speaker. Moreover, this practice requires one or more people to listen to the speaker only for purposes of critiquing the speaker, and such a convenience is not available most of the time. Additionally, this practice does not critique the speaker's participation in a group dialogue, and instead only focuses on a speaker's practice solo speech, thereby not enabling a constructive feedback regarding the speaker's participation in a dialogue with other participants.

It is thought that this invention may improve the well-being of multiple types of people, including but not limited to: novice teachers, experienced teachers, teacher coaches, pre-service teachers, sales managers, business executives and doctors. Teachers spend most of their time in dialogue with their students in order to educate them; however, it is often difficult for educators, particularly novice and pre-service teachers, to determine if they are doing an effective job of communicating. Further, it is often difficult for teachers to determine the best way to verbally engage students. Further, teachers may not be sure how to connect their knowledge to a particular curriculum. Further, they may not be sure which type of learning they may be implementing in the classroom. And finally, teachers have a need to keep themselves updated on professional development, such as effective communication skills.

Providing feedback for teachers on communication and teaching skills is essential for their ability to effectively educate their students; however, there lacks an appropriate way to measure teachers' effectiveness in communication. Further, it is arduous to gather data for evaluating teacher performance. Further, if a teacher is not able to access feedback or data on his/her performance, then it is not possible for the teacher to self-evaluate and make the necessary changes to improve his/her skills.

Professionals working in the field of sales also rely heavily on dialogue for job success. For example, a sales person needs to be able to engage in the correct type of dialogue with customers in order gain and maintain their interest for a sales pitch. Further, the salesperson has to be able to effectively communicate the idea or product that is for sale. Finally, salespeople also have a need for evaluation of their speaking abilities.

It is important, often imperative, that medical professionals, particularly doctors, be able to effectively communicate with patients. An ineffective doctor-patient interview can result in an incorrect diagnosis or otherwise negatively affect the health of a patient. Further, many doctors are known to have difficult bedside manners which can impede communication, as well as cause undue anxiety or stress for a patient. And finally, a patient may not follow medical instructions due to a lack of comprehension of what the doctor said.

SUMMARY OF THE INVENTION

A preferred embodiment of the invention relates to a dialogue analysis system that can analyze the speech of a user communicating with other participants in a dialogue. The user can be a lead speaker of the dialogue. The dialogue analysis system can receive voice signals of the user and the other participants from their respective communication devices. Subsequently, the dialogue analysis system can identify the speech of a user in order to differentiate that speech from speeches of other participants. The dialogue analysis system can analyze the speech of the user as well as the collective speeches of the other participants. Based on the analysis, the dialogue analysis system can generate a customized report for the user. The dialogue analysis system can deliver the customized report for the user to a computing device of an entity (for example, an employer of the user) and/or the user.

The subject matter described herein provides many technical advantages. For example, the dialogue analysis system enables a user—for example, a lead speaker of a dialogue—to analyze his or her own speech without requiring criticisms from other participants of the dialogue. Further, the analysis of the speech provided by the dialogue analysis system is factually accurate, and is clearly displayed graphically by using pie charts, bar charts, histograms, line graphs, and/or pictorial graphs, thereby clearly informing a user about his or her participation in the dialogue. Furthermore, the dialogue analysis system categorically stores questions discussed during a dialogue, and allows a user to replay specific parts of the voice signal specific to his or her dialogue in order to more deeply analyze his or her speech. In some implementations, the dialogue analysis system can also allow a user to compare his speech analytics and voice signal with analytics and voice signals with other users also using a dialogue analysis system. Accordingly, the dialogue analysis system can substantially expedite the speech improvement process of users. Additionally, the dialogue analysis system includes a computing server that can include several software development kits and web modules that advantageously allow the user and other participants to participate in the dialogue via any computing device, including mobile computing devices, of their choice.

In some embodiments of the invention, it allows the teacher coaches to increase their effectiveness. In some embodiments of the invention, it allows the teacher coach to personalize the learning for teachers. In some embodiments of the invention, it allows teachers to personalize learning for themselves. In some embodiments of the invention, it highlights knowledge gaps in a teaching skill set to allow for more effective professional development.

Some embodiments of the invention allow the sales manager to personalize the learning for a sales team. Some embodiments of the invention highlight knowledge gaps in the members of a sales team skill set to allow for more effective coaching or teaching. Some embodiments of the invention allow the business executive or coach to personalize the learning for the executive. In some embodiments of the invention, it highlights gaps in the executive's skill set to allow for more effective coaching or teaching for guiding meetings.

In some embodiments of the invention, it allows the teacher of a degreed program to personalize the learning for the pre-service teachers. In some embodiments of the invention, it highlights gaps in pre-service teachers' skill set to allow for more effective coaching or teaching.

In some embodiments of the invention, health or diagnosis efficacy can be enhanced by a more effective doctor-patient interview. In some embodiments of the invention, doctors may improve bedside manner. In some embodiments of the invention, there may be a reduction in patient anxiety and stress as a result of better doctor-patient dialogue. In some embodiments of the invention, it may allow patients to follow instructions due to effective comprehension from doctor dialogue.

In some embodiments of the invention, it allows people to determine how much they are talking. In some embodiments of the invention, people are provided with immediate feedback about their communication. In some embodiments of the invention, it allows people to set goals and track progress for better communication. In some embodiments of the invention, one is provided with tangible data of a particular state of a person's communication effectiveness for continued improvement.

In some embodiments of the invention, one may be able to provide easily readable reports. In some embodiments of the invention, it allows one to identify a main speaker apart from a group of participants. In some embodiments of the invention, it allows determination of a question statement from a dialogue for processing and reports. In some embodiments of the invention, it allows a visual display of the pattern of a main speaker and the participants to be used for feedback and constructive means.

DETAILED DESCRIPTION

Figure 1:
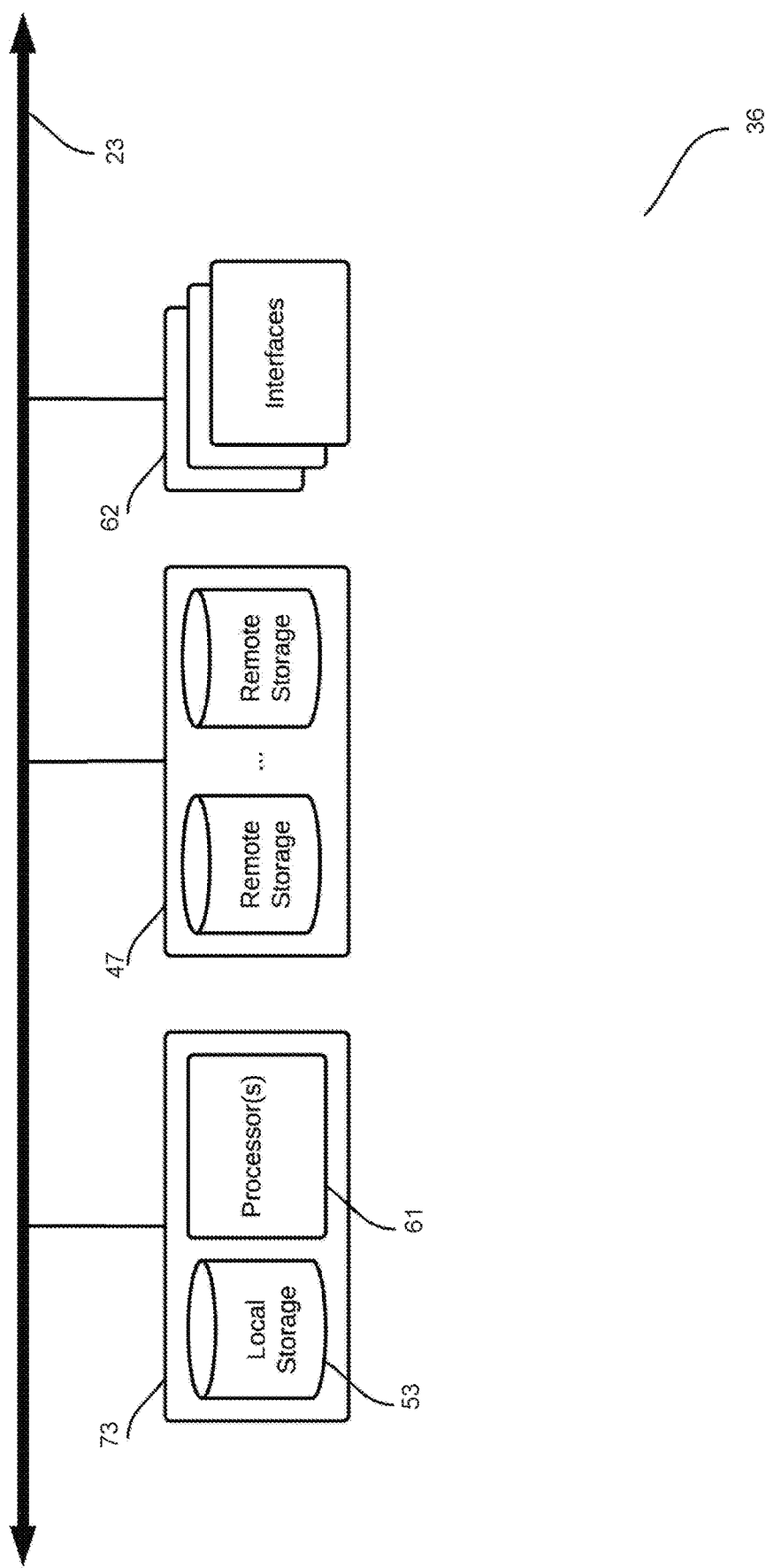
FIG. 1 is a diagram view which shows an exemplary hardware architecture of a computing device used in an embodiment of the invention.

One or more different inventions may be described in the present application. Further, for one or more embodiments of the invention described herein, numerous alternative embodiments may be described; it should be appreciated that these are presented for illustrative purposes only and are not limiting of the inventions contained herein or the claims presented herein in any way.

One or more embodiments of the invention may be widely applicable to numerous embodiments, as may be readily apparent from the disclosure. In general, embodiments are described in sufficient detail to enable those skilled in the art to practice one or more embodiments of the invention, and it should be appreciated that other embodiments may be utilized and that structural, logical, software, electrical and other changes may be made without departing from the scope of the particular inventions.

Accordingly, one skilled in the art will recognize that one or more embodiments of the inventions may be practiced with various modifications and alterations. Particular features of one or more embodiments of the inventions described herein may be described with reference to one or more particular embodiments or figures that form a part of the present disclosure, and in which are shown, by way of illustration, specific embodiments of the invention.

It should be appreciated, however, that such features are not limited to usage in the one or more particular embodiments or figures with reference to which they are described. The present disclosure is neither a literal description of all embodiments of the invention nor a listing of features of one or more embodiments of the invention that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of the invention and in order to more fully illustrate one or more aspects of various embodiments of the invention. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more embodiments of the invention, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of the invention need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, a computing device 36 (as in FIG. 1) comprises an electronic device capable of executing software- or hardware-based instructions according to one or more programs stored in memory. In some embodiments, examples of a computing device 36 may include: desktop computers, carputers, game consoles, laptops, notebooks, a palmtop, a tablet, smartphones, smartbooks, or a server system utilizing CPU, local memory and/or remote memory, and interface(s). In some embodiments, a computing device 36 serves to communicate with a plurality of other computing devices, such as clients or servers, over communications networks. A computing device 36 preferably comprises one or more CPU 73, one or more interface 62, one or more NIC 75, one or more busses 70, one or more memory 71, one or more nonvolatile memory 31, one or more storage devices 42, one or more input devices 46, one or more input output units 34, one or more operating systems 35, one or more output devices 45, one or more real time clock 43, and finally one or more power supply 52.

CPU 73 (as in FIG. 1) comprises a unit responsible for implementing specific functions associated with the functions of a specifically configured computing device or machine. In some embodiments, examples of CPU 73 may include: a system-on-a-chip (SOC) type hardware, a Qualcomm SNAPDRAGON™, or a Samsung EXYNOS™ CPU. In some embodiments, a CPU 73 serves to perform one or more of the different types of functions and/or operations under the control of software modules or components, which for example, may include an operating system and any appropriate applications software, drivers, and the like. In yet other embodiments, a CPU 73 may also serve to run software that carry out one or more functions or applications of embodiments of the invention. Additionally, in other embodiments, the CPU 73 serves to carry out computing instructions under control of an operating system. CPU 73 preferably comprises one or more processor 61 and one or more local memory 53.

In some embodiments, examples of a processor 61 may include: an Intel processor, an ARM processor, a Qualcomm processor, an AMD processor, application-specific integrated circuits (ASICs), electrically erasable programmable read-only memories (EEPROMs), field-programmable gate arrays (FPGAs), a mobile processor, a microprocessor, a microcontroller, a microcomputer, a programmable logic controller, or a programmable circuit.

A local memory 53 (as in FIG. 1) comprises one or more physical devices used to store programs (sequences of instructions) or data (e g. program state information) on a temporary or permanent basis for use in a computer or other digital electronic device, which may be configured to couple to the system in many different configurations. In some embodiments, examples of a local memory 53 may include: non-volatile random access memory (RAM), read-only memory (ROM), or a one or more levels of cached memory. In some embodiments, a local memory 53 serves to cache and/or store data. In other embodiments, a local memory 53 may also serve to store programming instructions.

An interface 62 (as in FIG. 1) comprises a mechanism to control the sending and receiving of data packets over a computer network or support peripherals used with the computing device 36. In some embodiments, examples of an interface 62 may include: network interface cards (NICs), Ethernet interfaces, frame relay interfaces, cable interfaces, DSL interfaces, token ring interfaces, graphics interfaces, universal serial bus (USB) interfaces, Serial port interfaces, Ethernet interfaces, FIREWIRE™ interfaces, THUNDERBOLT™ interfaces, PCI interfaces, parallel interfaces, radio frequency (RF) interfaces, BLUETOOTH™ interfaces, near-field communications interfaces, 802.11 (WiFi) interfaces, frame relay interfaces, TCP/IP interfaces, ISDN interfaces, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, or fiber data distributed interfaces (FDDIs). An interface 62 preferably comprises one or more physical ports 44, one or more independent processor 27, and finally one or more interface memory 37.

A communications network 23 (as in FIG. 1) comprises a communications network that allows computers to exchange data using known protocols. In some embodiments, examples of a communications network 23 may include: a personal area network, a wireless personal area network, a near-me area network, a local area network, a wireless local area network, a wireless mesh network, a wireless metropolitan area network, a wireless wide area network, a cellular network, a home area network, a storage area network, a campus area network, a backbone area network, a metropolitan area network, a wide area network, an enterprise private network, a virtual private network, an intranet, an extranet, an Internetwork, an Internet, near field communications, a mobile telephone network, a CDMa network, GSM cellular networks, or a WiFi network. A remote memory 47 (as in FIG. 1) comprises a service that provides users with a system for the backup, storage, and recovery of data.

Figure 2:
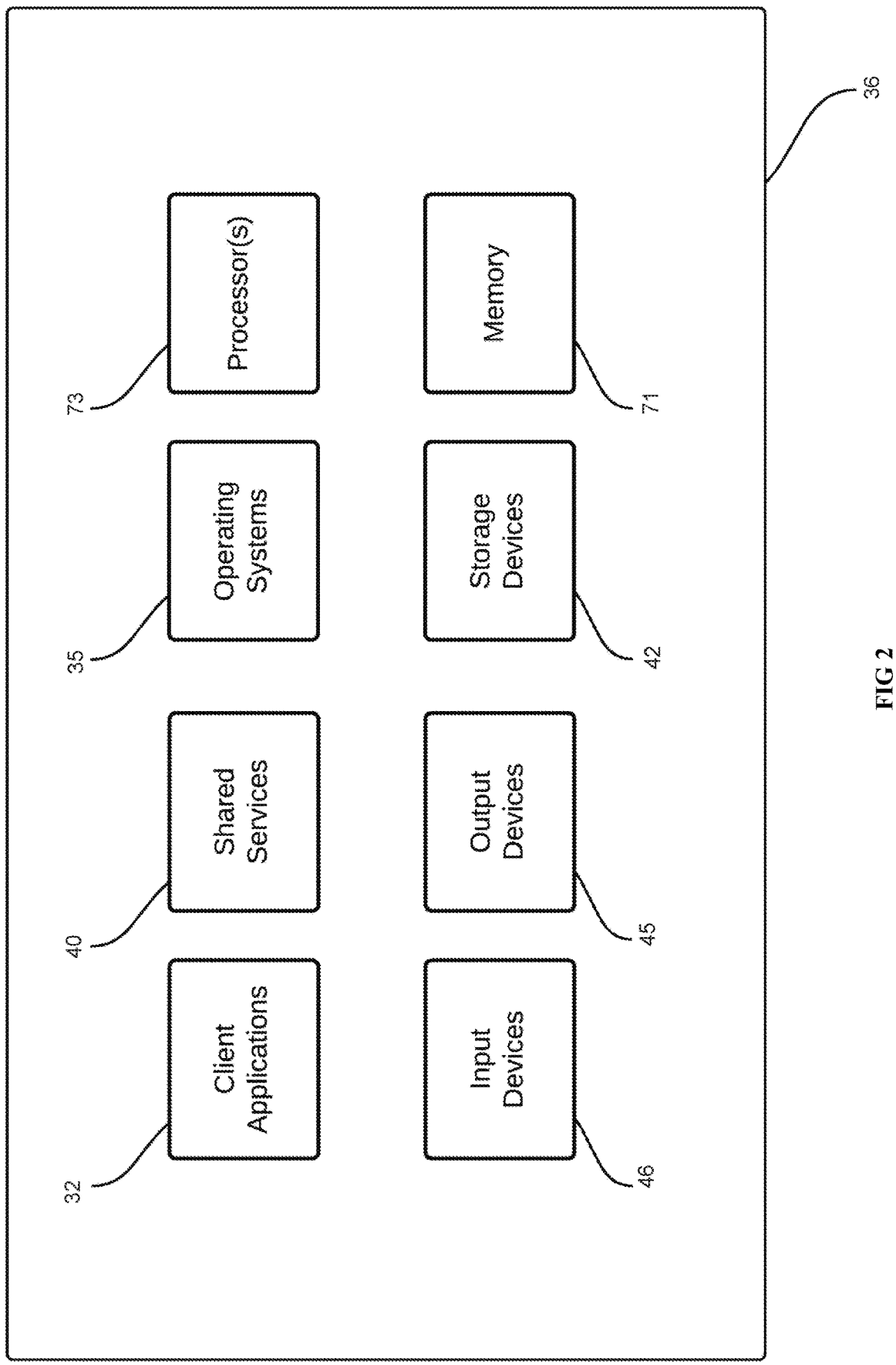
FIG. 2 is a diagram view which shows an exemplary logical architecture for a client device, according to an embodiment of the invention.

Referring now to FIG. 2, memory 71 (as in FIG. 2) comprises mechanism designed to store program instructions, state information, and the like for performing various operations described herein, may be storage devices 42, in some embodiments. In some embodiments, examples of a memory 71 may include: read-only memory (ROM), read-only memory devices (ROM), a memristor memory, random access memory (RAM), or RAM hardware modules. In some embodiments, a memory 71 serves to cache and/or store data. In yet other embodiments, a memory 71 may also serve to store programming instructions. In yet other embodiments, a memory 71 may also serve to store program instructions for the general-purpose network operations. In yet other embodiments, a memory 71 may also serve to store information relating to the functionality of the system. In yet other embodiments, a memory 71 may also serve to store data structures. In yet other embodiments, a memory 71 may also serve to store configuration data. In yet other embodiments, a memory 71 may also serve to store encryption data. In yet other embodiments, a memory 71 may also serve to store historical system operations information. Additionally, in other embodiments, the memory 71 serves to store generic non-program information.

Operating systems 35 (as in FIG. 2) comprises system software that manages computer hardware and software resources and provides common services for computer programs. In some embodiments, examples of operating systems 35 may include: a Microsoft's WINDOWS™, an Apple's Mac OS/X, iOS operating systems, a Linux operating system, or a Google's ANDROID™ operating system. Input devices 46 (as in FIG. 2) comprises device of any type suitable for receiving user input. Input devices 46 preferably comprises one or more keyboard 63, one or more touchscreen 56, one or more microphone 57, a mouse 72, a touchpad 66, and finally a trackball 59.

Output devices 45 (as in FIG. 2) comprises device of any type suitable for outputting computing device 36 related information. In some embodiments, examples of output devices 45 may include: a screens for visual output, speakers, or printers. Storage devices 42 (as in FIG. 2) comprises mechanism designed to store information which in some embodiments may be memory 71. In some embodiments, examples of storage devices 42 may include: magnetic media, hard disks, floppy disks, a magnetic tape, optical media, CD-ROM disks, magneto-optical media, optical disks, a flash memory, solid state drives (SSD), "hybrid SSD" storage drives, swappable flash memory modules, thumb drives, hot-swappable hard disk drives, solid state drives, removable optical storage discs, or an electrical storage device. Shared services 40 (as in FIG. 2) comprises web-enabled services or functionality related to a computing device 36.

Figure 3:
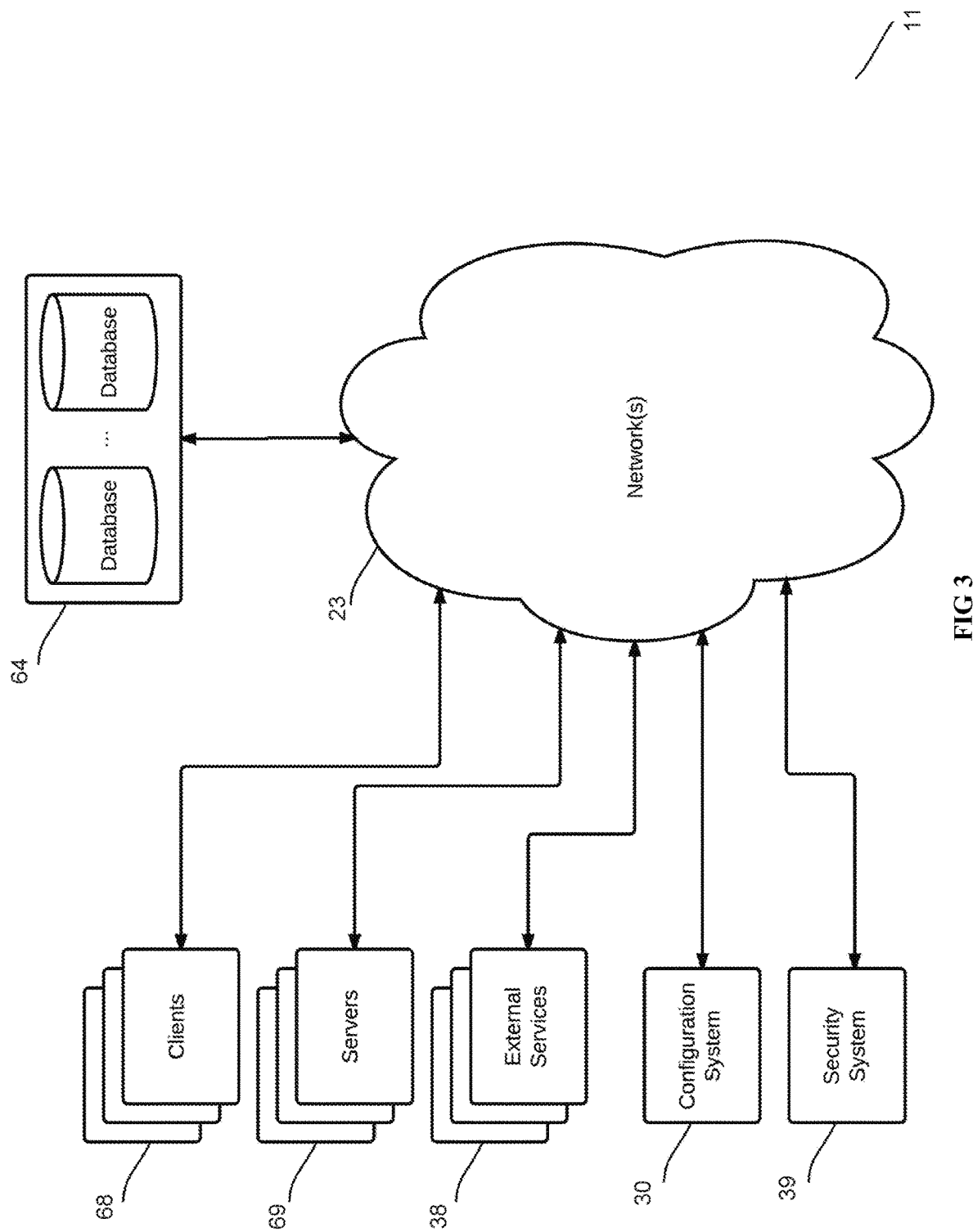
FIG. 3 is a diagram view which shows an exemplary architectural arrangement of clients, servers, and external services, according to an embodiment of the invention.

Referring now to FIG. 3, a client 68 (as in FIG. 3) comprises one or more computing device 36 with program instructions 29 for implementing client-side portions of the present system which in some embodiments, may be connected to a communications network 23. A server 69 (as in FIG. 3) comprises a computing device 36 configured to handle requests received from one or more client 68 over a communications network 23. In some embodiments, a server 69 serves to call one or more external services 38 when needed to obtain additional information, or to refer to additional data concerning a particular call. A configuration system 30 (as in FIG. 3) comprises a system common to information technology (IT) and web functions that implements configurations or management system.

A database 64 (as in FIG. 3) comprises an organized collection of data within a program's instruction related system, designed to allow the definition, creation, querying, update, and administration of databases. In some embodiments, examples of a database 64 may include: a relational database system, a NoSQL system, a Hadoop system, a Cassandra system, a Google BigTable, column-oriented databases, in-memory databases, or clustered databases.

Figure 4:
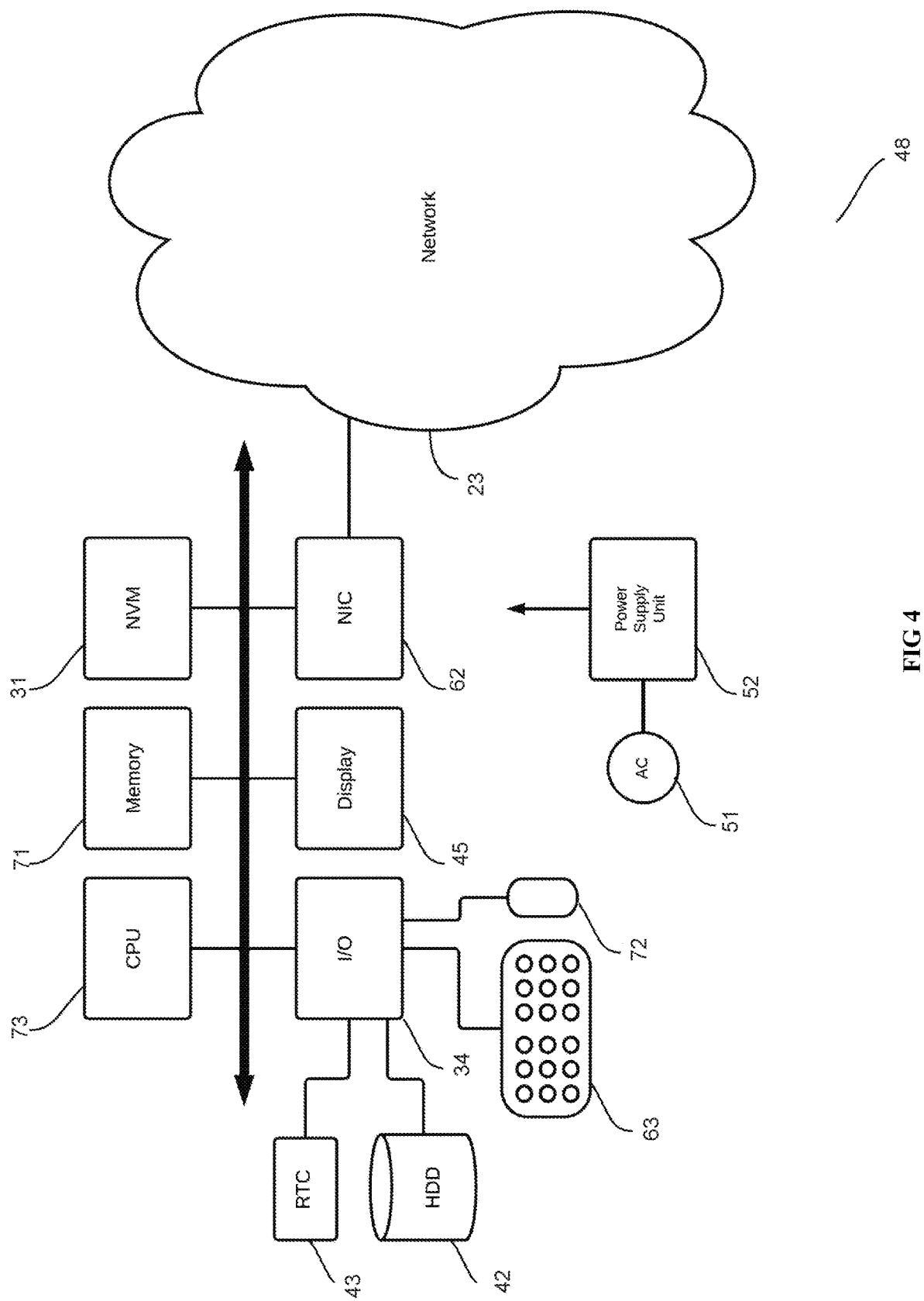
FIG. 4 is a diagram view which shows an embodiment of a hardware architecture of a computing device used in various embodiments of the invention.

Referring now to FIG. 4, a nonvolatile memory 31 (as in FIG. 4) comprises computer memory that can retrieve stored information even after having been power cycled (turned off and back on).

A real time clock 43 (as in FIG. 4) comprises a computer device clock (most often in the form of an integrated circuit) that keeps track of the current time. Input output units 34 (as in FIG. 4) comprises devices used by a human (or other system) to communicate with a computer.

A power supply 52 (as in FIG. 4) comprises an electronic device that supplies electric energy to an electrical load. A power supply 52 preferably comprises one or more power source 51. In some embodiments, an example of a power source 51 could be an AC power or a DC power and the like.

Figure 5:
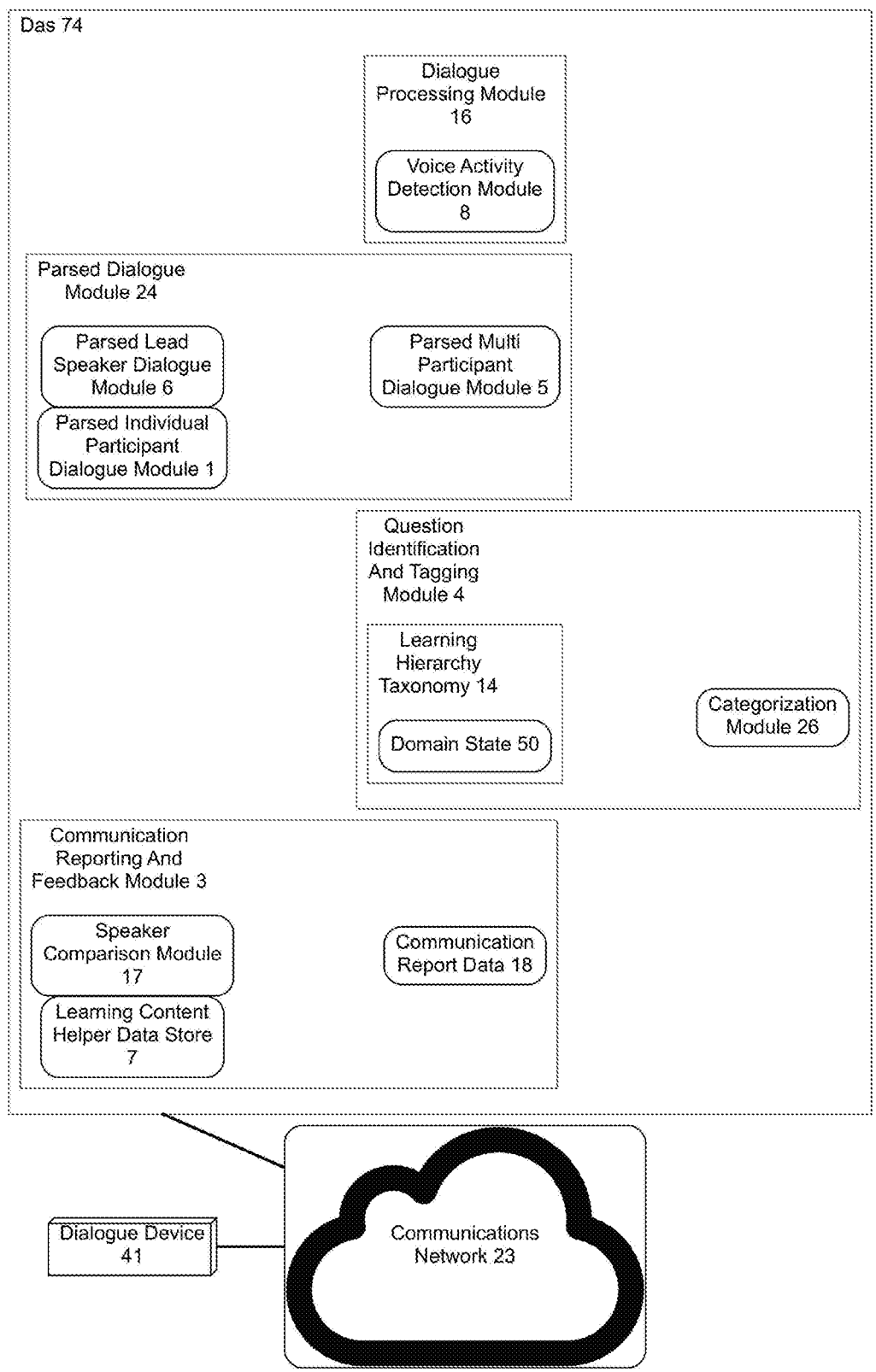
FIG. 5 is a diagram view which shows relationships of the DAS and the distributed computing network.

Referring now to FIG. 5, DAS 74 (as in FIG. 5) comprises a dialogue analysis system of a plurality of modules that identifies one or more lead speaker and one or more participants and provides communication data for improvement. The DAS 74 preferably comprises a dialogue processing module 16, a parsed dialogue module 24, a question identification and tagging module 4, and finally a communication reporting and feedback module 3. A dialogue processing module 16 comprises programming instructions that captures, stores, or processes data relative to a dialogue, such as number of participants, participant types, names, times, audio spoken and the like. The dialogue processing module 16 preferably comprises the voice activity detection module 8. A voice activity detection module 8 comprises programming instructions for performing voice activity detection.

A parsed dialogue module 24 comprises a module that captures, stores, or processes data which may include raw data r computed data (or both) from a dialogue data captured from a plurality of speakers that may ultimately be desired for one or more communication report data 18. In a preferred embodiment, parsed dialogue module 24 may capture, store, or process audio characteristics data such as, at least, "length of time" data for the recorded dialogue data. In some embodiments, it serves to detect time stamps of statements by an identified one or more lead speakers and one or more participant speakers within the recorded data. In other embodiments, it serves to capture, store, or process the length of silences in the recorded dialogue data. In yet other embodiments, the parsed dialogue module 24 serves to capture, store, or process the time between a question statement 33 and the length of time until an answer occurs. A parsed dialogue module 24 preferably comprises a parsed multi participant dialogue module 5, a parsed lead speaker dialogue module 6, and, a parsed individual participant dialogue module 1.

A parsed multi participant dialogue module 5 (as in FIG. 5) comprises a module that captures, stores, or processes data that may include raw data and/or computed data that may ultimately be desired for one or more communication report data 18 that is the sum identified evaluation of participants in a dialogue as a group. In some embodiments, a purpose of the parsed multi participant dialogue module 5 is to capture, store, or process the length of time speaking of the multi-participants. In other embodiments, it serves to denote the total number of seconds multi-participant group members are speaking within the recorded dialogue data. In other embodiments, it serves to identify the percent of speaking time compared to a portion or the entire recorded dialogue data. In other embodiments, it serves to capture, store, or process the time relative to the lead speaker 49. In other embodiments, it serves to detect the time stamps of statements by at least one identified lead speakers and the one or more participant speakers. In yet other embodiments, it serves to capture, store, or process the multi-participant silence time.

In some embodiments, if, for example, the lead speaker is speaking 95% of the time, then the system may flag that as inappropriate and notify the lead speaker. In other embodiments, the parsed multi-participant dialogue module serves to measure the silence time after a question from the lead speaker to a participant. If the silence time is less than 3 seconds, for example, only 1 second, the system may flag that as inappropriate and notify the lead speaker; otherwise, if the silence time is greater than 3 seconds, for example between 3 to 10 seconds, then the system may commend or not notify the lead speaker.

A parsed lead speaker dialogue module 6 may comprise programming instructions to capture, store, and/or process data which may include raw data and/or computed data that may ultimately be desired for one or more communication report data 18 that is specific to one or more lead speaker(s) in the recorded dialogue data. In some embodiments, a purpose of parsed lead speaker dialogue module 6 is to capture, store, or process the length of time speaking for the lead speaker 49. In other embodiments, it may serve to identify a percent of speaking time compared to a portion or the entire duration of the recorded dialogue data. In other embodiments, it serves to detect time stamps of statements by at least one identified lead speakers relative to the other participant speakers. In other embodiments, it serves to capture, store and/or process the at least one lead speaker silence time. In other embodiments, the parsed lead speaker dialogue module 6 serves to identify speech patterns, such as "uh", "um", or other conversational cues. In yet other embodiments, if parsed lead speaker dialogue module 6 detects the phrase "um", for example, three times in one question statement, then the system may flag that as inappropriate and notify the lead speaker.

A parsed individual participant dialogue module 1 may comprise programming instructions that capture, store, and/or process data which may include raw data and/or computed data that may ultimately be desired for one or more communication report data 18 that may be the evaluation of an individual participant in a dialogue. Parsed individual participant dialogue module 1 has many purposes which are as follows: First, a purpose of the parsed individual participant dialogue module 1 may be to capture, store, and/or process the length-of-time speaking by an individual participant versus other participants and the lead speaker. Next, it may serve to identify metadata differences relevant to other participants. Lastly, parsed individual participant dialogue module 1 may serve to detect timestamps of statements by an individual participants and by lead speaker relative to the other participant speakers.

A question identification and tagging module 4 may comprise programming instructions that evaluate a plurality of audio signals or parsed language text from at least one lead speakers in order to identify question statements. Question identification and tagging module 4 preferably comprises categorization module 26 and learning hierarchy taxonomy 14. Question identification and tagging module 4 has an alternative embodiment herein termed the "question identification by audio analysis" embodiment. Categorization module 26 may comprise programming instructions that evaluates one or more question statement within the recorded dialogue data for its relative position and/or domain state 50 within learning hierarchy taxonomy 14. Learning hierarchy taxonomy 14 may comprise one or more hierarchical models used to classify educational learning objectives into levels of complexity and specificity. In some embodiments, learning hierarchy taxonomy 14 could be a Blooms Revised Taxonomy™ or perhaps a WEBB Depth of Knowledge Taxonomy™, and the like. Learning hierarchy taxonomy 14 preferably comprises the domain state 50.

A domain state 50 may compris a defined portion of a learning process of one or more concepts within learning hierarchy taxonomy 14. In some embodiments, examples of a domain state 50 may include: a remembering domain state, an analyzing domain state, a creating domain state, an evaluating domain state, an applying domain state, or an understanding domain state.

Communication reporting and feedback module 3 may comprise programming instructions that gives feedback to a plurality of computing devices 36 (as in FIG. 7) associated to a speaker set which may include a summary report of a dialogue that evaluates dialogue audio data parameters in conjunction with data related to one or more question statement which may include one or more name state with learning hierarchy taxonomy 14. Communication reporting and feedback module 3 preferably comprises communication report data 18, speaker comparison module 17, and learning content helper data store 7.

Communication report data 18 may comprise data and/or a summary report of a dialogue that evaluates parsed dialogue module 24 data in conjunction with data related to one or more question statement which may include one or more name state with a learning hierarchy taxonomy 14. Speaker comparison module 17 may comprise one or more interfaces that allow one or more speakers with a speaker data profile to compare and assist one another in a group setting. Learning content helper data store 7 may comprise content that may be pushed to a computing device 36 (as in FIG. 7) as part of a communication report data 18 that may be queried and displayed as a result of the specific evaluation of an instance or cumulative of dialogue audio data parameters.

Figure 6:
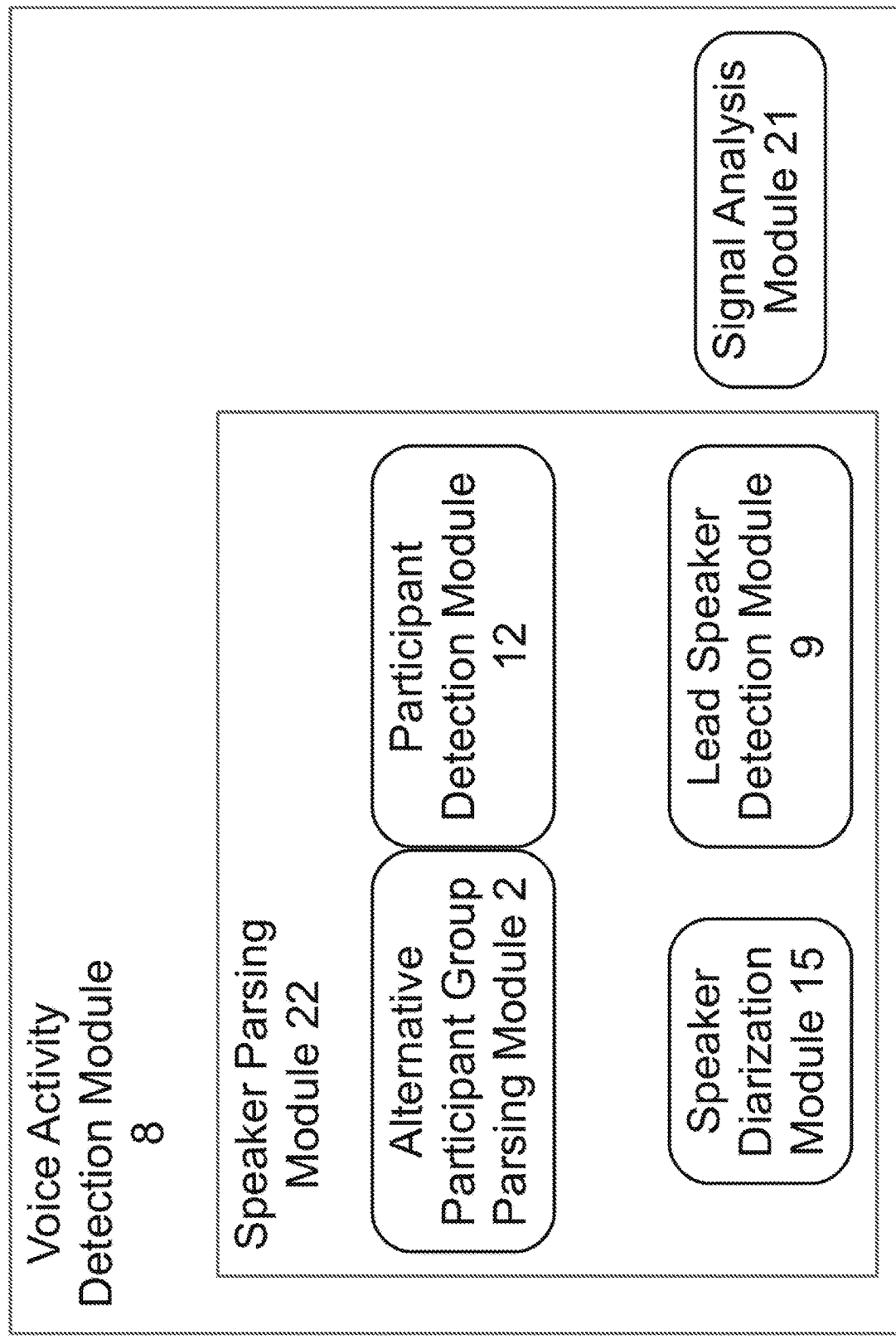
FIG. 6 is a diagram view which shows the relationships of the voice activity detection module

Referring now to FIG. 6, voice activity detection module 8 preferably comprises signal analysis module 21 and speaker parsing module 22. Signal analysis module 21 comprises a module that analyzes or processes waveform characteristics of an audio file associated to recorded dialogue data. In some embodiments, signal analysis module 21 may include: a time based energy processing module, a spectral variance processing module, a sub-band energy processing module, a zero-crossing rate processing module, an absolute values processing module, a median filtering processing module, or the like. Speaker parsing module 22 may comprise programming instructions that evaluate a speaker associated to recorded dialogue data to parses an identity of one or more lead speakers and/or one or more participant speakers. Speaker parsing module 22 preferably comprises lead speaker detection module 9, participant detection module 12, speaker diarization module 15, and an alternative participant group parsing module 2.

Speaker diarization module 15 may comprise programming instructions that identifies and delimits speakers in an audio file 58 associated to recoded dialogue data. Alternative participant group parsing module 2 may comprise programming instructions to assign alternative identities to individuals or groups in a speaker set, for example, gender, age, native language, grammar use, at-risk groups, and/or the like.

Figure 7:
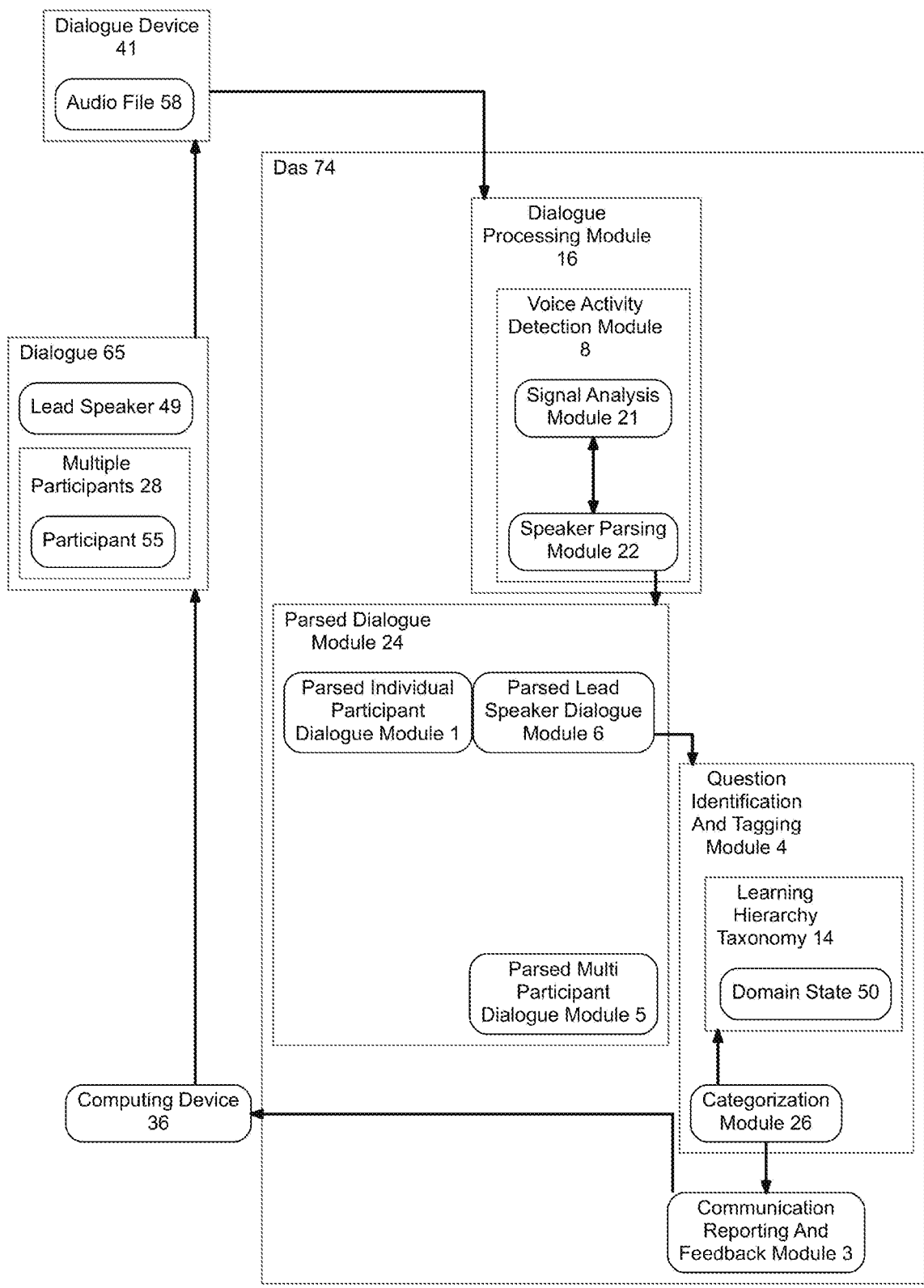
FIG. 7 is a diagram view which shows the flowchart of the logic of the DAS

Referring now to FIG. 7, an overall logic flow of the system and the directions of information transfer. Dialogue 65 may comprise a verbal communications exchange between one or more lead speaker and one or more participant in wherein the verbal exchange is recorded as data into an audio file. Multiple participants 28 may comprise individual speakers in recorded dialogue data who may not be a lead speaker.

Lead speaker 49 may comprise an entity of a dialogue data identified as a lead speaker by the lead speaker detection module 9 and in some embodiments may be the focus of the communication report data 18. Dialogue device 41 may comprise data associated to a verbal communications exchange between one or more lead speaker and one or more participant in wherein the exchange may be recorded into an audio file. Participant 55 may comprise an entity of a dialogue data identified as a participant by participant detection module 12.

Audio file 58 may comprise a digital file that captures the content of a dialogue 65 during or after its occurrence. In some embodiments, examples of an audio file 58 may include: a 0.3gp file, a .aa file, a .aac file, a .aax file, a .act file, a .aiff file, a .amr file, a .ape file, a .au file, a .awb file, a .dct file, a .dss file, a .dvf file, a .flac file, a .gsm file, a .iklax file, a .m4a file, a .m4b file, a .m4p file, a .mp3 file, a .mpc file, a .msv file, a .ogg file, a .opus file, a .ra file, a .rm file, a .raw file, a .sln file, a .tta file, a .vox file, a .wav file, a .wma file, a .wv file, or a .webm file.

Figure 8:
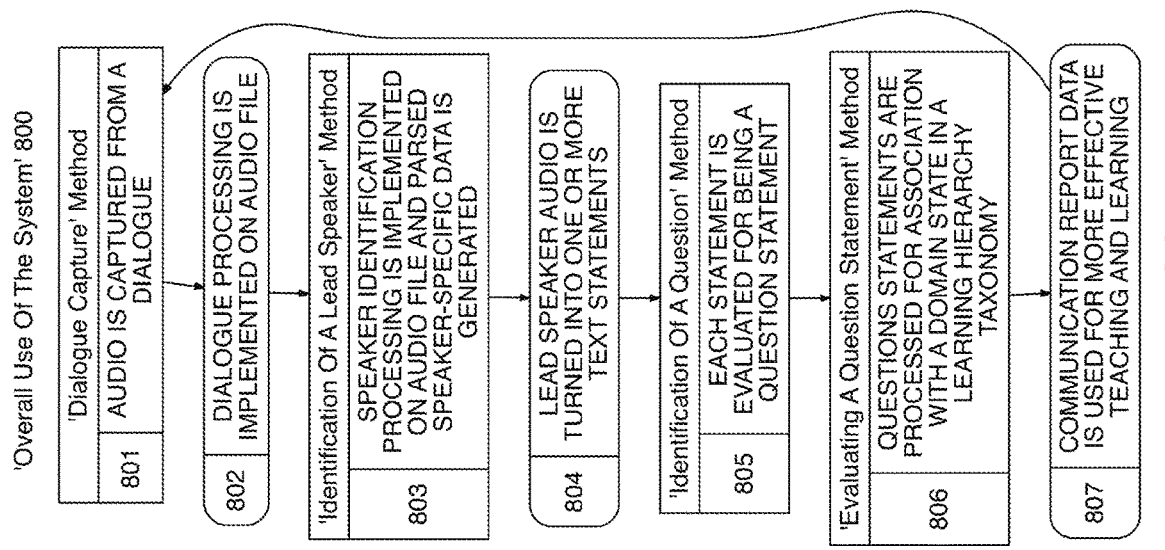
FIG. 8 is a diagram view which shows overall use of the system.

Referring now to FIG. 8, in a preferred embodiment of the invention, in a first step, a dialogue 65 is established with multiple participants that may be captured by dialogue processing module 16 from a dialogue device 41 (Step 801). This is further detailed below in (Step 901-Step 902).

Figure 9:
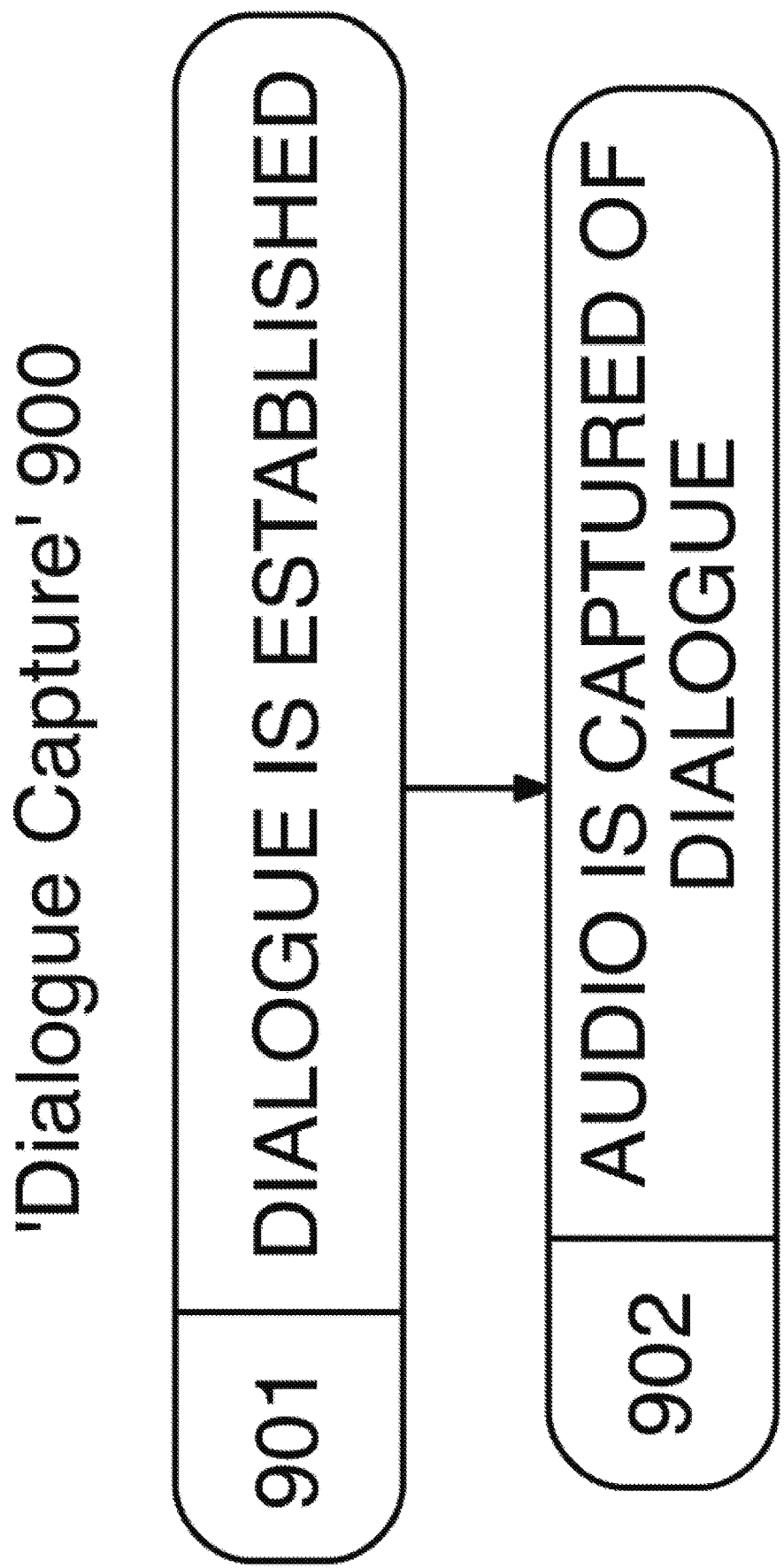
FIG. 9 is a diagram view which shows the method for dialogue capture.

Now referring to FIG. 9, dialogue 65 may be established between one or more lead speakers 49 and multiple participants 28 (Step 901). Next, an audio file 58 is captured that may contain content of dialogue 65 (Step 902). Referring back to FIG. 8, audio file 58 may be processed by DAS 74 by dialogue processing module 16 (Step 802). Next, speaker parsing module 22 and general voice activity detection module 8 may identify times of dialogue 65 wherein a presumptive lead speaker 49 may be talking and may be evaluated by parsed dialogue module 24 and in some embodiments, one or more signal analysis module 21 (Step 803). This is further detailed below in (Step 1001-Step 1008).

Figure 10:
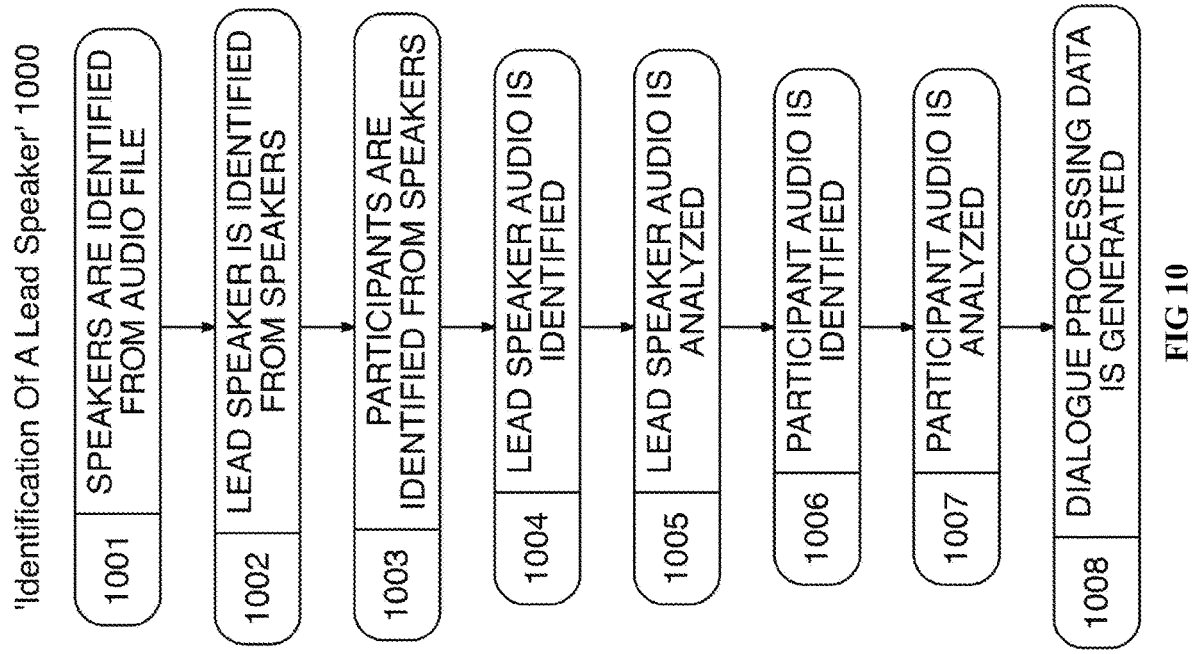
FIG. 10 is a diagram view which shows process of identification of a lead speaker.

Now referring to FIG. 10, speaker diarization module 15 may identify two or more speakers 67 in dialogue 65 and may create an array of speakers for evaluation (Step 1001). Next, lead speaker detection module 9 identifies one or more lead speaker 49 from a speaker set as being separate from one or more participants of the speaker set (Step 1002). Next, participant detection module 12 identifies one or more participants 55 from the speaker set as being separate from one or more lead speakers 49 of the speaker set (Step 1003). Next, lead speaker audio data 20 is generated from audio file 58 or group of audio files 58 (Step 1004).

Next, lead speaker audio data 20 is analyzed by parsed lead speaker dialogue module 6 (Step 1005). Next, participant audio data is generated from audio file 58 or group of audio files 58 (Step 1006). Next, participant audio data 25 is analyzed by a parsed multi participant dialogue module 5 (Step 1007). Next, data is generated from parsed multi participant dialogue module 5, parsed lead speaker dialogue module 6, and in some embodiments parsed individual participant dialogue 65 (Step 1008). Next, DAS 74 evaluates lead speaker audio data 20 and generates one or more statements (Step 804). Next, one or more statements is evaluated by a question identification and tagging module 4 until one or more question statement is identified (Step 805). This is further detailed below in (Step 1101-Step 1102).

Figure 11:
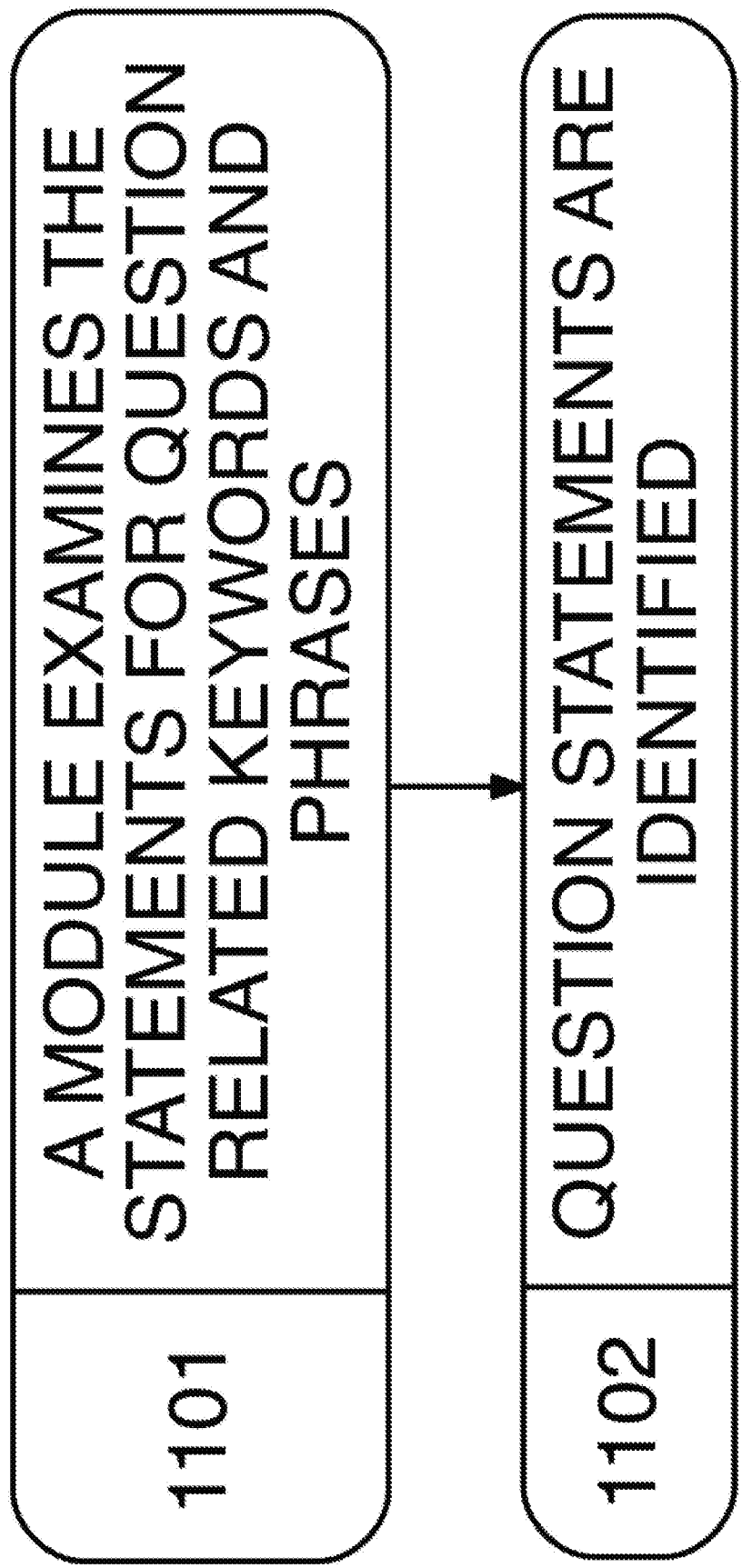
FIG. 11 is a diagram view which shows process of identification of a question.

Now referring to FIG. 11, in a first step, identify whether keywords or phrases associated with sentences or statements in order to determine if it may be a question via question identification and tagging module 4 (Step 1101). Next, one or more question statements are identified (Step 1102). Next, communication reporting and feedback module 3 evaluates one or more question statement for producing one or more communication report data 18 (Step 806). This is further detailed below in (Step 1201-Step 1203).

Figure 12:
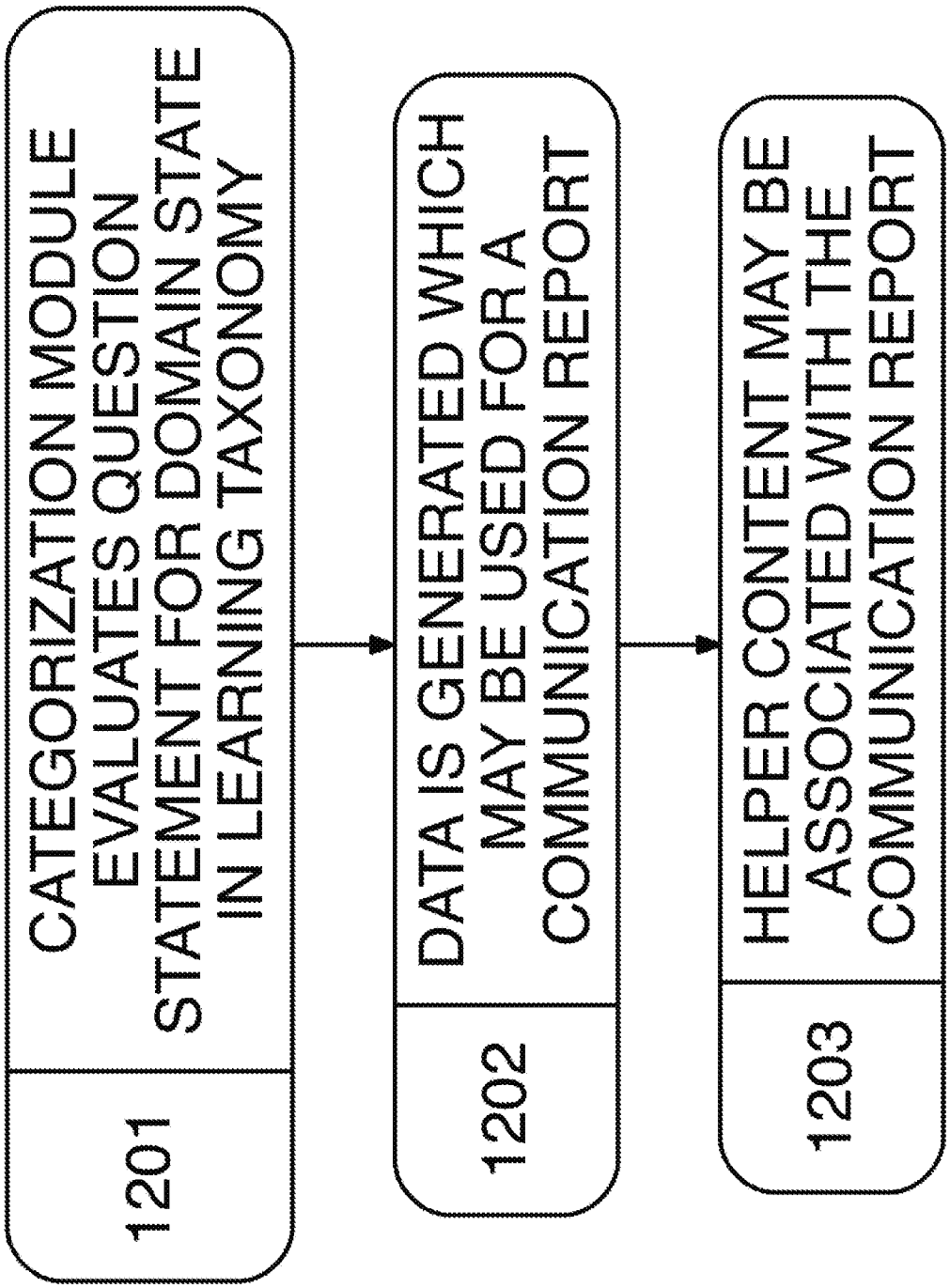
FIG. 12 is a diagram view which shows process of evaluating a question statement.

Now referring to FIG. 12, for each question statement, categorization module 26 analyzes the content of the question statement for its domain state 50 within a learning hierarchy taxonomy 14 (Step 1201). Next, communication report data 18 is prepared which may include one or more domain states 50 associated with one or more question statements 33 (Step 1202). Next, associated content may be configured with communication report data 18 from learning content helper data store 7 (Step 1203). Next, a user may evaluate the communication report data 18 via computing device 38, for example, for more effective learning or teaching communication. In some embodiments, there may be speaker comparison module 17 for feedback (Step 807).

A preferred embodiment of the invention may have some elements that are commonly known and other terms defined as specific to this specification. These include: dialogue 65, dialogue device 41, one or more audio file 58, multiple participants 28, one or more speaker 67, speaker set 54, voice activity detection 19, one or more lead speaker 49, one or more participant 55, lead speaker detection module 9, participant detection module 12, lead speaker audio data 20, participant audio data 25, one or more statement 60, one or more question statement 33, one or more computing device 36, one or more CPU 73, one or more processor 61, one or more local memory 53, one or more interface 62, one or more physical ports 44, one or more independent processor 27, one or more interface memory 37, one or more NIC 75, one or more busses 70, one or more memory 71, one or more nonvolatile memory 31, one or more storage devices 42, one or more input devices 46, one or more keyboard 63, one or more touchscreen 56, one or more microphone 57, mouse 72, touchpad 66, trackball 59, one or more input output units 34, one or more operating systems 35, one or more output devices 45, one or more real time clock 43, one or more power supply 52, one or more power source 51, one or more program instructions 29, distributed computing network 11, one or more client application 32, one or more client 68, one or more server 69, one or more external service 38, one or more shared services 40, one or more database 64, one or more security system 39, configuration system 30, one or more remote memory 47, one or more system server 48, and one or more communications network 23. However, their use and relationships to the novel components and steps of a preferred embodiment of the invention render them applicable herein. In order to preface the roles that they play in the specification, they are subsequently explained here.

A speaker may comprise a person who participates in dialogue 65 that may be identified by speaker diarization module 15. A speaker set may comprises a group of speakers in a dialogue 65 that have not yet been identified into lead speakers or participant speakers. Voice activity detection 19 may comprise acts of identifying at least one lead speaker and/or one or more participant speakers from an audio file 58 of recorded dialogue data 65.

Lead speaker audio data may comprise associations, assignments, and/or data of at least a portion of data from an audio file representing the verbal contribution of a lead speaker to a dialogue. Participant audio data may comprise associations, assignments, and/or data of at least a portion of an audio file representing the verbal contribution of one or more participants to a dialogue. A statement may comprise a portion of total text of lead speaker audio data.

A question statement comprises a type of statement that may have been evaluated by a question detection module and has been identified as a question. In some embodiments, an example of an independent processor could be an audio processor or a video processor and the like. In some embodiments, an independent processor may serve to allow communication with appropriate media.

In some embodiments, an example of an interface memory 37 may include volatile and/or non-volatile memory (e.g., RAM) and the like. NIC 75 comprises a computer hardware component that connects a computer to a computer network. Busses 70 comprises a communication system that transfers data between components inside a computer, or between computers.

Input output units 34 (as in FIG. 4) comprises devices used by a human (or other system) to communicate with a computer. Program instructions (or blocks of them as modules) 29 comprise a mechanism for control execution of, or comprise of an operating system, and/or one or more applications. In some embodiments, examples of program instructions 29 may include: an object code, a code produced by a compiler, a machine code, a code produced by an assembler or a linker, a byte code, or a code executed using an interpreter. In some embodiments, program instructions 29 serves to communicate with a plurality of other computing devices, such as clients or servers, over communications networks. Program instructions 29 serve to implement the system and/or methods of the present invention.

A distributed computing network 11 comprises any number of client 68 and/or server 69 operably connected to a communications network 23 for the purposes of implementing the system. A distributed computing network 11 preferably comprises one or more client application 32, one or more client 68, one or more server 69, one or more external services 38, one or more shared services 40, one or more database 64, one or more security system 39, and finally a configuration system 30.

An external service 38 comprises web-enabled services or functionality related to or installed on a computing device 36 itself which may be deployed on one or more of a particular enterprise's or user's premises. A security system 39 comprises a system common to information technology (IT) and web functions that implements security related functions for the system. A system server 48 comprises a computing device 36 that communicates with a plurality of other computing devices, such as clients or servers, over communications networks.

The skilled person will be aware of a range of possible modifications of the various embodiments described above. Accordingly, the present invention is defined by the claims and their equivalents.

What is claimed is:

1. A system for dialogue analysis comprising:
   a network-connected dialogue analysis computer comprising at least a memory and a processor and further comprising programmable instructions stored in the memory and operating on the processor, the instructions, when executed by the processor, cause the processor to analyze recorded dialogue data captured from an audio source, the dialogue analysis computer further comprising:
   a dialogue processing module;
   a parsed dialogue module;
   a question identification and tagging module;
   a communication reporting and feedback module;
   a parsed multi-participant dialogue module;
   a parsed lead speaker dialogue module;
   a parsed individual participant dialogue module;
   wherein the dialog processing module captures, stores, and processes the recorded dialogue data;
   wherein the parsed dialogue module identifies a plurality of speakers, and, at least, audio characteristics data within the recorded dialogue data;
   wherein the question identification and tagging module identifies one or more question statements within the recorded dialogue data and evaluates the one or more question statements, based at least in part on audio characteristics data to produce an evaluation;
   wherein the communication reporting and feedback module provides feedback to a computing device, the feedback based on the evaluation;

wherein the parsed multi-participant dialogue module computes a length of speaking time for the one or more participants;

wherein the lead speaker dialogue module computes a percent of speaking time of the at least one lead speaker compared to all speakers of the plurality of speakers within the recorded dialogue;

wherein the parsed individual participant dialogue module compares a computed length of speaking time for each participant of the one or more participants to a computed speaking time by other participants of the one or more participants and the at least one lead speaker.

2. The system of claim 1, wherein the dialogue processing module comprises:
a lead speaker detection module;
a participant detection module;
a speaker diarization module;
wherein the lead speaker detection module identifies at least one lead speaker from the plurality of speakers;
wherein the participant detection module identifies one or more participants from the plurality of speakers;
wherein the speaker diarization module identifies and delimits the plurality of speakers in the recorded dialogue data.

3. The system of claim 2, wherein the audio characteristics data comprises, at least:
time stamps of statements by the at least one lead speakers and the one or more participants; and,
one or more length-of-silence values in the recorded dialogue data.

4. The system of claim 3, wherein the one or more length-of-silence values is a length of silence between the one or more question statements and an associated one or more answers occur.

5. The system of claim 4, wherein upon a first length-of-silence being greater than 3 seconds, flag the associated question as commendable.

6. The system of claim 1, wherein the question identification and tagging module comprises:
a learning hierarchy taxonomy;
wherein the learning hierarchy taxonomy comprises one or more hierarchical models used to classify a plurality of educational learning objectives into levels of complexity and specificity; and,
wherein the evaluation is based on a relative position within the learning hierarchy taxonomy for each of the one or more question statements.

7. The system of claim 6, wherein the learning hierarchy taxonomy comprises a plurality of domain states, each domain state defines a domain of a learning process of one or more concepts within the learning hierarchy taxonomy.

8. The system of claim 7, wherein the evaluation is further based an associated domain state of the plurality of domain states where each question statement falls within the learning hierarchy taxonomy.

9. The system of claim 8, wherein the plurality of domain states are selected from the group consisting of, a remembering domain state, an analyzing domain state, a creating domain state, an evaluating domain state, an applying domain state, and an understanding domain state.

10. A method for dialogue analysis comprising:
a network-connected dialogue analysis computer comprising at least a memory and a processor and further comprising programmable instructions stored in the memory and operating on the processor, the instructions when executed by the processor cause the processor to perform the steps of:
capturing, storing, and processing at a dialog processing module, the recorded dialogue data;
identifying, at a parsed dialogue module, a plurality of speakers, within the recorded dialogue data;
processing, at the parsed dialogue module, at least, audio characteristics data within the recorded dialogue data;
identifying, at a question identification and tagging module, one or more question statements within the recorded dialogue data;
evaluating, at a question identification and tagging module, the one or more question statements, based at least in part on the audio characteristics data to produce an evaluation;
providing, by a communication reporting and feedback module, feedback to a computing device, the feedback based on the evaluation;
wherein the parsed multi-participant dialogue module computes a length of speaking time for the one or more participants;
wherein the lead speaker dialogue module computes a percent of speaking time of the at least one lead speaker compared to all speakers of the plurality of speakers within the recorded dialogue;
wherein the parsed individual participant dialogue module compares a computed length of speaking time for each participant of the one or more participants to a computed speaking time by other participants of the one or more participants and the at least one lead speaker.

11. The method of claim 10, wherein the dialogue processing module comprises:
a lead speaker detection module;
a participant detection module;
a speaker diarization module;
wherein the lead speaker detection module identifies at least one lead speaker from the plurality of speakers;
wherein the participant detection module identifies one or more participants from the plurality of speakers;
wherein the speaker diarization module identifies and delimits the plurality of speakers in the recorded dialogue data.

12. The method of claim 11, wherein the audio characteristics data comprises, at least:
time stamps of statements by the at least one lead speakers and the one or more participants; and,
one or more length-of-silence values in the recorded dialogue data.

13. The method of claim 12, wherein the one or more length-of-silence values is a length of silence between the one or more question statements and an associated one or more answers occur.

14. The method of claim 13, wherein upon a first length-of-silence being greater than 3 seconds, flag the associated question as commendable.

15. The method of claim 10, wherein the question identification and tagging module comprises:
a learning hierarchy taxonomy;
wherein the learning hierarchy taxonomy comprises one or more hierarchical models used to classify a plurality of educational learning objectives into levels of complexity and specificity; and,
wherein the evaluation is based on a relative position within the learning hierarchy taxonomy for each of the one or more question statements.

16. The method of claim 15, wherein the learning hierarchy taxonomy comprises a plurality of domain states, each domain state defines a domain of a learning process of one or more concepts within the learning hierarchy taxonomy.

17. The method of claim 16, wherein the evaluation is further based an associated domain state of the plurality of domain states where each question statement falls within the learning hierarchy taxonomy.

18. The method of claim 17, wherein the plurality of domain states are selected from the group consisting of, a remembering domain state, an analyzing domain state, a creating domain state, an evaluating domain state, an applying domain state, and an understanding domain state.

* * * * *